June 20, 1961  M. W. NIXON  2,989,069
LOW PRESSURE RELIEF AND VACUUM CHECK VALVE
Filed July 5, 1957  4 Sheets-Sheet 1
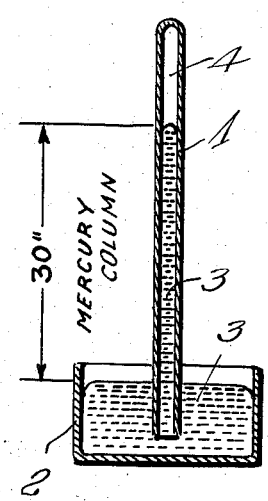
Fig. 1
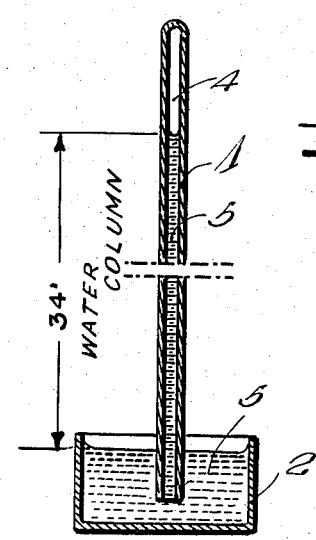
Fig. 2
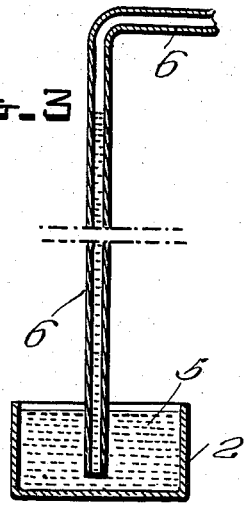
Fig. 3
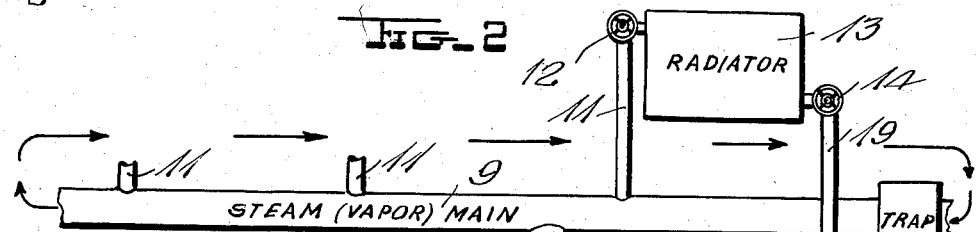
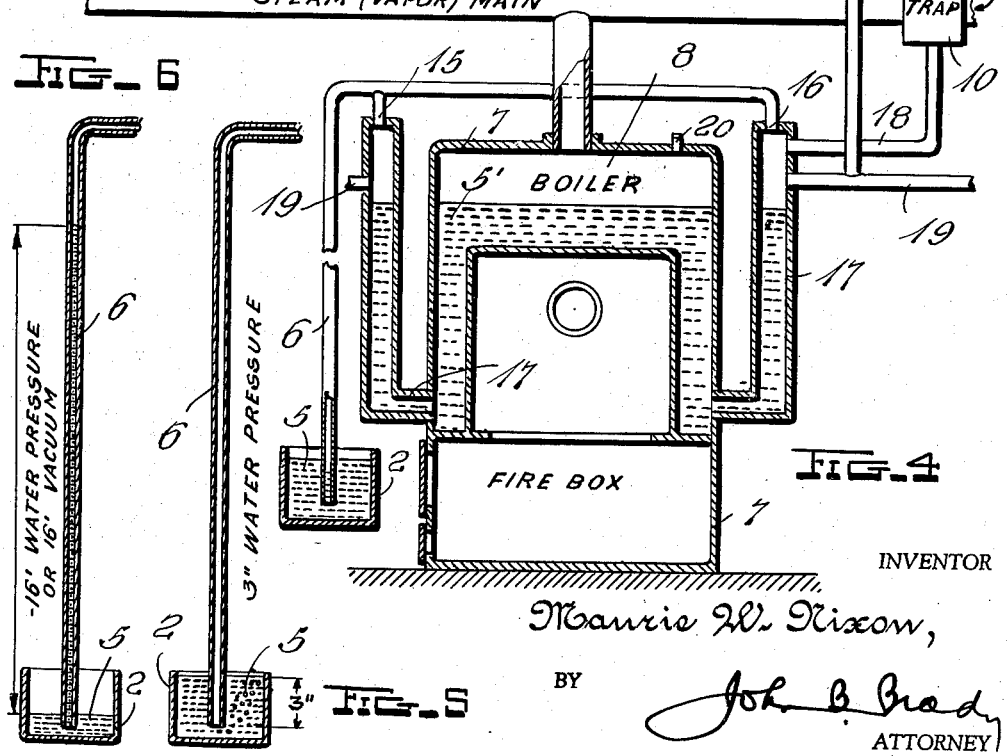
INVENTOR
Maurie W. Nixon,
BY
John B. Brady
ATTORNEY June 20, 1961  M. W. NIXON  2,989,069
LOW PRESSURE RELIEF AND VACUUM CHECK VALVE
Filed July 5, 1957  4 Sheets-Sheet 2
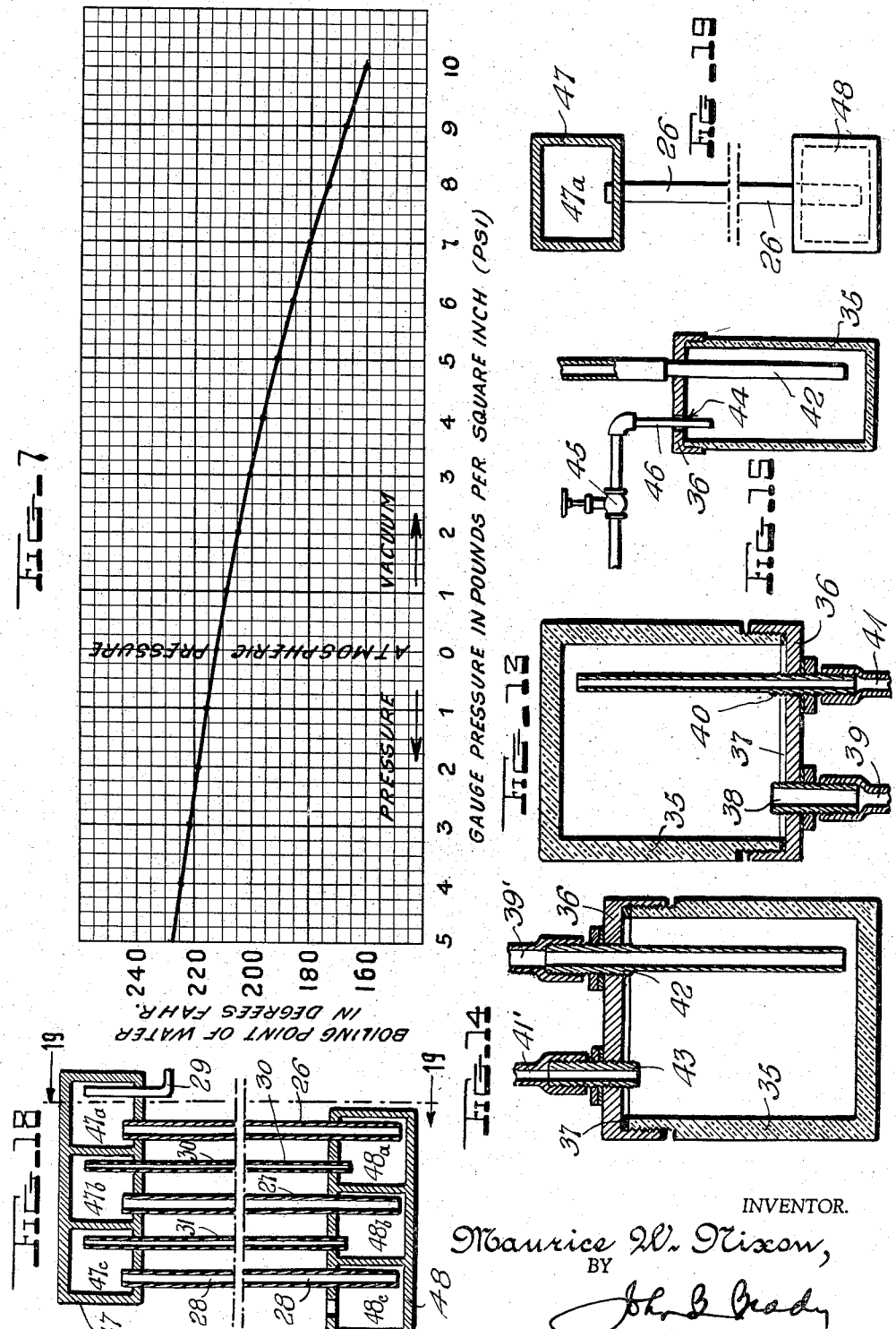
INVENTOR.
Maurice W. Nixon,
BY
John B. Brady
ATTORNEY.

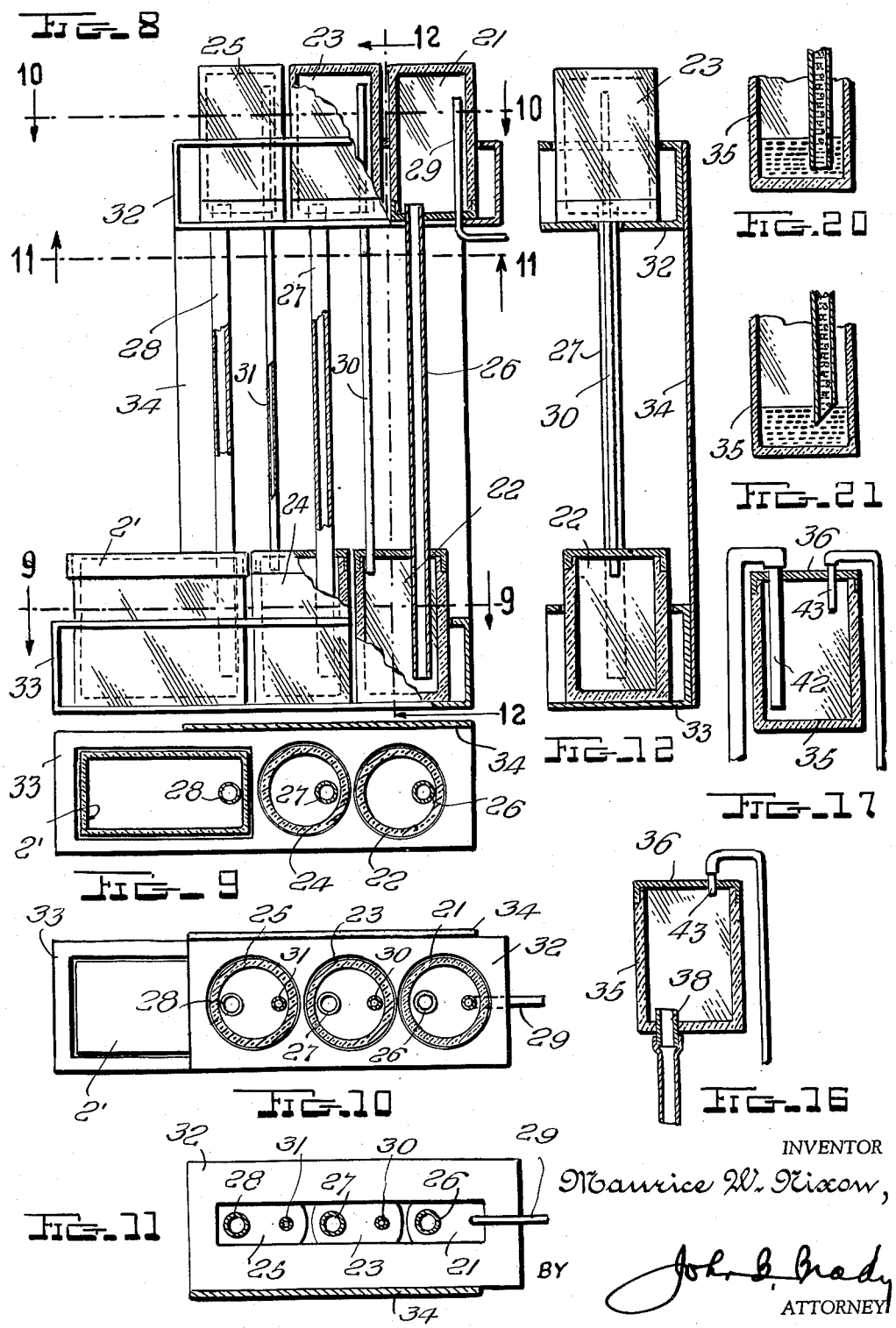

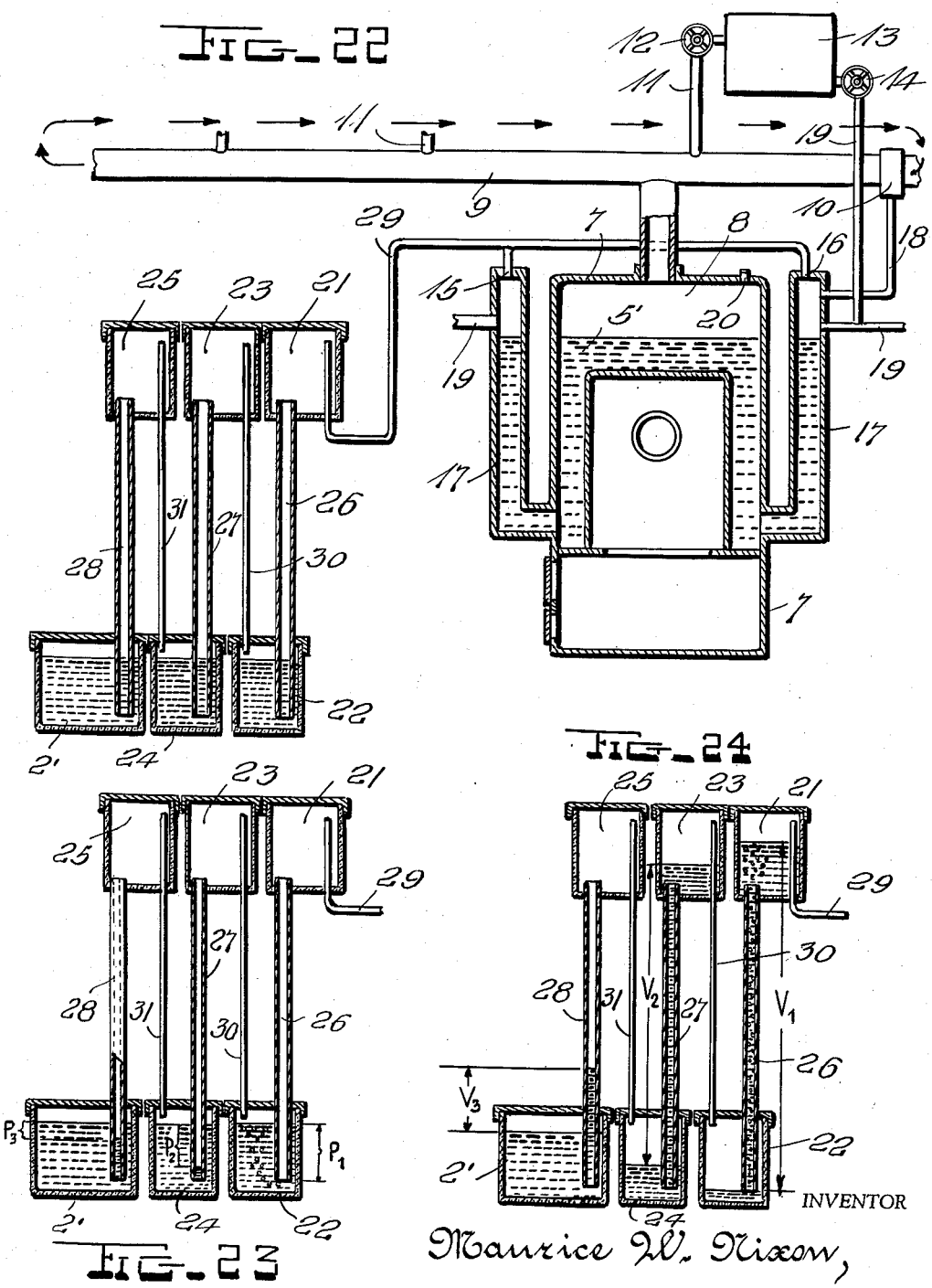

United States Patent Office 2,989,069
Patented June 20, 1961

2,989,069
LOW PRESSURE RELIEF AND VACUUM CHECK VALVE
Maurice W. Nixon, Madison Heights, Va.
Filed July 5, 1957, Ser. No. 670,199
2 Claims. (Cl. 137—251)

My invention relates broadly to pressure relief and vacuum checking systems in heat exchangers and more particularly to a low pressure relief and vacuum check valve to be applied to low pressure steam or vapor, or vacuum, heating systems, or other such closed pressure and/or vacuum containers of variable pressure or vacuum.

One of the objects of my invention is to provide a heating system having a low pressure relief and vacuum check valve which permits air to escape from a heating system, etc., at very low pressure during periods of positive and rising pressure.

Another object of my invention is to provide a pressure relief valve that can be adjusted to regulate the maximum pressure desired in any such system, controlled, within the practical limits permitted by the low pressure relief system.

Another object of my invention is to provide a vacuum check valve which can maintain the maximum vacuum attainable in a heating system or other such systems.

Another object of my invention is to provide a vacuum check valve, the construction of which can be adjusted to regulate the maximum vacuum desired in the controlled system.

Another object of my invention is to provide a low pressure relief and vacuum check valve which does not necessarily employ expensive heavy liquids, such as mercury, but can employ inexpensive fluids such as water.

Another object of my invention is to provide a method of constructing a low pressure relief and vacuum check valve within dimensional limitations which will allow it to be fitted or "customized" to the particular application with regard to the vertical or horizontal space available for installation.

Still further objects of my invention are to provide a low pressure relief and vacuum check valve system which: contains no movable mechanical parts, thus giving it a lasting quality and requiring a minimum of care and attention for maintenance on the part of the operator; can be constructed from inexpensive material; and can be easily installed and started on the system to which it is applied.

Other and further objects of my invention are set forth more fully in the specification hereinafter following by reference to the accompanying drawings, in which:

FIG. 1 is a transverse sectional view of a Toricelli tube mercury barometer;

FIG. 2 is a transverse sectional view of a Toricelli tube water barometer, foreshortened to be kept in proportion with FIG. 1;

FIG. 3 is a transverse sectional view of the basic open end Toricelli tube, the principle on which my low pressure relief and vacuum check valve operates;

FIG. 4 is a schematic view, partially in section, of a typical low pressure steam or vapor type heating system and particularly showing the manner in which the basic form of the low pressure relief and vacuum check valve of my invention is attached to such system;

FIG. 5 is a foreshortened transverse sectional view of an open end Toricelli tube and particularly illustrating the manner in which air pressure discharges from the tube when it is attached to a system in a state of increasing pressure;

FIG. 6 is substantially the same as FIG. 5 but illustrating the vacuum checking effect of the open end Toricelli tube when connected to a system in a state of increasing vacuum;

FIG. 7 is a graph of the relationship between the boiling point of water and gauge pressure and particularly illustrating that as the pressure changes the boiling point of water changes;

FIG. 8 is an elevational view partly in transverse section of the low pressure relief and vacuum check valve of my invention mounted on a supporting structure;

FIG. 9 is a view partially in cross-section taken substantially along line 9—9 of FIG. 8;

FIG. 10 is a view partially in cross-section taken substantially along line 10—10 of FIG. 8;

FIG. 11 is a view partially in cross-section taken substantially along line 11—11 of FIG. 8;

FIG. 12 is a view partially in transverse section taken substantially along line 12—12 of FIG. 8;

FIG. 13 is an enlarged transverse sectional view of an upper container of the low pressure relief and vacuum check valve and illustrating particularly one method by which the tubes may connect to and gain access to such a container;

FIG. 14 is an enlarged transverse sectional view of a lower container of the low pressure relief and vacuum check valve;

FIG. 15 is a schematic view of a modified sump container associated with a water supply source;

FIG. 16 is a schematic view illustrating a modified method of attaching the tubes to an upper container;

FIG. 17 is a schematic view illustrating another modified method of connecting the tubes to an upper container;

FIG. 18 is a schematic view of the low pressure relief and vacuum check valve of my invention illustrating the use of compartmental containers rather than individual containers;

FIG. 19 is a transverse sectional view taken substantially along line 19—19 of FIG. 18;

FIG. 20 is a transverse sectional view of the lower end of a water tube and illustrating particularly an alternate air leak port in the tube;

FIG. 21 is a transverse sectional view of the lower end of a water tube and illustrating particularly an alternate beveled end tube;

FIG. 22 is a schematic view illustrating the manner in which the low pressure relief and vacuum check valve of my invention is attached to a typical low pressure steam or vapor type heating system, and also showing the liquid level in said valve system when the heating system is at atmospheric pressure or 0 p.s.i. gage pressure;

FIG. 23 is a schematic view of FIG. 8 and particularly illustrating the effect on the low pressure relief and vacuum check valve when the system to which it is attached is in a state of increasing air pressure; and FIG. 24 is a schematic view showing the effect of a decreasing pressure or vacuum condition on the low pressure relief and vacuum check valve system.

My invention is directed to the construction of a low pressure relief and vacuum check valve or system to be applied to low pressure steam, or vapor, or vacuum heating systems, or such other closed low pressure and/or vacuum containers of variable pressure, or vacuum, wherein it is desired to exhaust air or other gases from the system under low pressure as the system becomes filled with another vaporous or gaseous substance, and after the pressure reaches a maximum and then decreases, to prevent the reentrance of atmospheric air as the pressure inside of the closed system is reduced and reaches a condition of high vacuum; and/or to control or regulate the maximum pressure or vacuum within such systems by the arrangement of the construction of the container and tube system which contains a liquid and the assembly of the apparatus hereinafter described in more detail.

Throughout the specification zero pressure shall be considered atmospheric pressure, or a gage pressure of 0.0 pounds per square inch (p.s.i.).

The relatively slight differences in atmospheric pressure due to barometric or meteorological changes or to variations in altitude are not taken into account as they have no significant effect on the action and operation of the low pressure relief and vacuum check valve hereinafter described.

Except as expressed in terms of pressure, air will be considered as having no weight in containers and interconnecting tubes in the apparatus hereinafter described. The slight difference in pressure due to the "weight" of the air column in low pressure relief and vacuum check valve has no significant effect on the action and operation of the apparatus, and elimination of this detail helps to simplify description of operation of the vacuum checking system.

Throughout this specification a low pressure steam or vapor, or vacuum heating system, is referred to as a typical example to describe the construction and operation of the low pressure relief and vacuum check valve of my invention.

The reference characters used throughout the several figures refer to similar parts.

PRINCIPLE OF OPERATION

The principle on which the low pressure relief and vacuum check valve system was developed is based on the principle of the Toricelli tube, which apparatus demonstrates the barometer principle.

In FIG. 1 I have shown a simple Toricelli tube mercury barometer consisting of closed tube 1 and sump 2, and containing mercury 3. This figure illustrates that a column of mercury will rise approximately thirty inches in a closed tube with atmospheric pressure on the pool of mercury in the sump 2 and under conditions of a perfect vacuum 4 in the top portion of the closed tube 1. FIG. 2 shows that water 5 will rise in a closed tube 1 approximately thirty-four feet with atmospheric pressure on the pool of water in the sump and a perfect vacuum 4 in the top portion of the closed tube 1.

In FIG. 3 I have shown the basic construction of the tube connected to the heating system as described hereinafter. Note that here the tube 6 is not a closed tube but in all other respects is similar to those shown in FIGS. 1 and 2.

Here it becomes necessary to describe the principal points regarding the operation of a vapor heating system as they pertain to, and affect, and are affected by the low pressure relief and vacuum checking system.

In a typical low pressure steam or vapor type heating system as shown in FIG. 4, firing of the boiler 7 by hand, stoker, or burning oil causes steam to be generated in chamber 8 from water 5′ and forced by the pressure thus developed through the steam main 9 to the trap 10, and through the branches or risers 11, through open radiator valves 12 and radiators 13 to the thermostatic valves 14. Condensate and air trapped in the system piping and radiators is compressed by the generated steam and must be allowed to escape, usually at the points 15 and 16 on the vertical return pipes 17. Condensate returns through the trap return line 18 and the radiator condensate return lines 19, and then downwardly through the vertical return pipes 17 into the water compartment of the boiler 7. The low pressure relief and vacuum check valve consisting of tube 6, sump 2 and containing water 5 is connected to pressure escape points 15 and 16 on vertical return pipes 17. The operation of a pressure limit switch 20, if used, serves to shut off an automatic firing device such as a stoker or an oil burner so that, in effect, the positive pressure in the system is limited to the opening setting of the pressure limit switch 20, which may be in the magnitude of 2 or 3 p.s.i. gage pressure. Residual heating, after such shutoff, especially in the case of coal stokers may raise the pressure in the heating system slightly, but this is insignificant and the condition and its effect on the low pressure relief and vacuum check valve is described hereinafter. With hand firing the positive pressure will vary over a wide range and will be dependent upon firing practice, setting of furnace controls as drafts, damper and check valves.

Thus air in the heating system must be eventually exhausted and the system filled with steam at low pressure. The complete exhausting of the air may occur in one or more cycles of operation, and over a period of time, especially in mild weather.

Considering the heating system and vacuum check valve at the time firing is stopped; and air blowing out escape points 15 and 16, under maximum pressure and thus the end of tube 6 submerged in water 5; the air will continue to blow out until the pressure falls to the equivalent of the inches of water pressure from the bottom of tube 6 to the surface of water 5. The above situation is illustrated in FIG. 5 and for illustration purposes the pressure at which the air in the system will stop exhausting from the end of tube 6 is three (3) inches of water pressure.

Considering FIG. 6, as condensation progresses, the pressure will start to decrease in the system and will continue to decrease below atmospheric pressure creating a negative pressure or vacuum. As the vacuum increases it will draw water 5 up in the water tube 6 to a height above the sump proportional to the degree of vacuum as shown in FIG. 6 and Table I which shows the relationship between vacuum and height of mercury and water columns in a vacuum, and temperature of boiling water, as follows:

Table I

| Vacuum in lbs. per sq. inch | Height of Mercury Column in inches | Height of Water Column in feet | Boiling Temperature of Water in deg. Fahr. |
|---|---|---|---|
| 0 | 0 | 0 | 212 |
| 1 | 2.04 | 2.3 | 208 |
| 2 | 4.08 | 4.6 | 204 |
| 3 | 6.12 | 6.9 | 200 |
| 4 | 8.16 | 9.2 | 196 |
| 5 | 10.2 | 11.5 | 192 |
| 6 | 12.25 | 13.8 | 186 |
| 7 | 14.3 | 16.1 | 180 |
| 8 | 16.3 | 18.4 | 174 |
| 9 | 18.4 | 20.7 | 168 |
| 10 | 20.4 | 23.0 | 160 |

In the foregoing table 1 lb. per sq. in.=2.312 ft. water=2.040 in. mercury.

It is characteristic of, and the feature of this type of heating system design, that the water will continue to boil at the reduced pressure and supply vapor or low pressure steam to the radiators and thus heat them for longer periods of time and at lower temperatures than is characteristic of steam pressure heating systems.

The relationship between degrees of vacuum, height of mercury and water columns, and the boiling point of water are given in Table I. The boiling point of a liquid varies with the pressure, and as the pressure changes the boiling point also changes. In FIG. 7 I have illustrated this relationship for water by means of a graph. Water is taken as the subject liquid since it is so considered throughout this specification but it is to be understood that other liquids could be similarly employed.

When the furnace has been operating but is presently shut off and more heat is required, or the furnace operates otherwise for a short interval, the system is under vacuum pressure and upon refiring the water boils immediately, producing vapor or steam which raises the pressure somewhat. The steam thus generated may or may not reach atmospheric pressure (which would cause air to be on the verge of discharge to the atmosphere), depending upon heating requirements and conditions. Whatever the pressure the height of the water column in the low pressure relief and vacuum check valve tube 6 adjusts accordingly.

Leakage of air into the heating system through leaky valve packings, fittings, etc., will not adversely effect the operation of the vacuum checking system. On the other hand, this air will be vented from the heating system in due course, entirely automatically by and upon the normal operation of the heating system and the low pressure relief and vacuum check valve as described herein. Thus the pressure and vacuum checking device described herein requires a minimum of care and attention on the part of the operator.

DESCRIPTION OF CONSTRUCTION

The folded Toricelli tube of my invention is shown in FIG. 8. This tube functions substantially the same as the single tube as hereinbefore described, but it has more practical application because of its compactness. The single tube, because of its height, would have very limited use. For example, by referring to Table I, if the maximum vacuum a particular system would ever attain was 10 p.s.i., a single tube of somewhat greater than twenty-three feet would be required, since this vacuum supports a water column twenty-three feet high. Not many installations could cope with a twenty-three foot tube.

The folded low pressure relief and vacuum check valve system of my invention consists of: upper containers 21, 23 and 25, and lower containers 22, 24 and sump 2'; interconnecting water tubes 26, 27 and 28 which contain water under certain conditions as described hereinafter; and, interconnecting air tubes 29, 30 and 31 containing only air under varying degrees of pressure or vacuum as described hereinafter.

Water tubes 26, 27 and 28 connect the bottom or lower portions of the upper containers 21, 23 and 25 with the lower portions of the lower containers 22, 24 and 2'. Lower container 2' is open to the atmosphere and is used as a sump, and may be larger than containers 22 and 24.

Tube 29 connects the upper container 21 to the heating system at pressure relief points 15 and 16 as shown in FIG. 22. This connecting tube may be flexible and of any length to permit remote location of the apparatus from the furnace. Air tubes 30 and 31 connect the top or upper portions of the upper containers 23 and 25 with the upper portions of the lower containers 22 and 24, respectively.

The entire assembly may be mounted on a supporting structure such as that indicated by reference characters 32, 33 and 34 which may be hung or otherwise supported.

All containers, tubes and connections must be air tight except that the sump 2' shall be open to the atmosphere. The materials of construction are not critical and may be plastic, glass, metallic, or other, or a combination, but must be capable of withstanding at least 15 pounds per square inch (p.s.i.) vacuum without collapsing. For illustrative purposes the container shown in FIG. 8 are constructed of glass. The methods of connecting the tubes to the containers may be one of many ways and is not specifically limited as long as the connections are air tight. Only one of these methods is set forth in the specification for illustrative purposes. The tubes and containers need not be of any fixed or definite size or proportions except as follows: Each upper container, except container 25, must have sufficient capacity to contain all of the water from the lower container to which it is connected. The water tubes 26, 27 and 28 must be of sufficient diameter so that any air bubbles that might develop in, or enter the water tube, will pass immediately upward through the water column into the upper containers and not become trapped by capillary action, thus lightening the weight of the water column and thus affecting the action and effectiveness of the system. By experiment a ¾₆ inch to ¼ inch diameters have been found to be the smallest practical diameters for the water tubes, 26, 27 and 28. The tir tubes 29, 30 and 31 may be of similar diameter, for example, approximately ⅛ inch in diameter.

The number of containers used, the number of interconnecting water and air tubes used, and the length of these interconnecting tubes used in the low pressure relief and vacuum check valve of my invention shall be determined by the space available for mounting the apparatus, and more important, by the maximum vacuum to which the device will be subjected. By referring to Table I it can be seen that the height of the water column varies, particularly with the degree of vacuum to which the check valve is subjected. For example, if the maximum vacuum to which it would ever be subjected was found to be 9 p.s.i., then since the height of the water column for this vacuum is 20.7 feet, the following are two of the possible arrangements for constructing the low pressure relief and vacuum check valve: (1) interconnecting water and air tubes approximately 10 feet in length, two interconnecting water tubes required with one interconnecting air tube and one attachment air tube, two upper containers and two lower containers, one being a sump; (2) interconnecting water and air tubes approximately 4 feet in length, five interconnecting water tubes, four interconnecting air tubes, one attachment air tube, five upper containers, and five lower containers, one of which is a sump.

FIGS. 13 and 14 are enlarged transverse sectional views of typical upper and lower low pressure relief and vacuum check valve containers, respectively. The containers consist of the container proper 35 and the threaded container cover 36 which is sealed by gasket 37. The upper container cover contains water tube connection fixture 38 which gives water tube 39 access to the lower portions of the upper container, and air tube connection fixture 40, which allows air tube 41 access to the upper portions of the upper container. The lower container cover, as seen in FIG. 14, contains water tube connection fixture 42, which allows water tube 39' access to the lower portions of the lower container, and air tube connection fixture 43 which gives air tube 41' access to the upper portions of the lower container.

A modified form of the sump 2' is shown in FIG. 15. It is basically the same as the lower container shown in FIG. 14 except that an air passage 44 is left in cover 36 instead of sealing said passage with an air connection fixture 43. The sump is located convenient to a water tap 45 to which hose 46 is attached and allowed to enter the sump through air passage 44. With this arrangement the water supply in the sump can be conveniently replenished since the water in the container will evaporate as it is open to the atmosphere.

FIG. 16 is a modified form of an upper container in which the water tube connection fixture 38 is situated in the bottom of container 35 and air tube connection fixture 43 is contained in the container cover 36. With this arrangement the container 35 is upright instead of inverted and the air tube is subjected to a sharp bend before it attaches to the container.

FIG. 17 is an additional modified form of an upper container. In this arrangement the container 35 is in an upright position and the container cover 36 contains water tube connection fixture 42, to allow the water tube access to the lower portions of the upper container, and air tube connection fixture 43, to allow the air tube access to the upper portions of the container. With this arrangement both the water and air tubes are subject to 180° bends before they attach to their respective connection fixtures.

Instead of having individual containers as set out in the above, the containers may be compartmented devices as shown in FIG. 18. Reference character 47 denotes the upper container which is divided into compartments 47a, 47b and 47c, which correspond to upper containers 21, 23 and 25, respectively, of FIG. 8. The lower container 48 is divided into compartments 48a, 48b and 48c which correspond respectively to lower containers 22, 24 and sump 2' of FIG. 8. With such an arrangement the tube connections are made in the usual manner as heretofore illustrated and all compartments must be air tight with respect to each other and the atmosphere. As before, compartment 48c is the exception and is open to the atmosphere.

FIGS. 20 and 21 are detailed transverse sectional views of the lower end of the water tube showing alternate end construction of same. The former shows the end of the tube cut off on a horizontal plane with an air leak hole 35' a short distance from that end. The latter view shows an alternate beveled end for the water tube instead of the conventional horizontally terminated end.

OPERATION OF THE PRESSURE RELIEF AND VACUUM CHECK VALVE

The operation of the folded low pressure relief and vacuum check valve is described by referring to FIGS. 22, 23 and 24.

The folded low pressure relief and vacuum check valve of my invention is shown connected to a typical low pressure steam or vapor type heating system in FIG. 22. Assume the lower containers 22, 24 and 2' are nearly full of water and that the upper containers 21, 23 and 25 and all tubes, both water tubes and air tubes, are full of air at atmospheric pressure except that the water tubes 26, 27 and 28 contain water at the water level in the lower containers as seen in FIG. 22. Further assume that the furnace 7 is about to produce some steam and that the heating system pipes 9, 11, 18, 19 and radiators 13 contain some air to be discharged.

As the furnace fire is increased and steam is produced in chamber 8, the steam enters the heating pipes and radiators, increasing the pressure in the system and, in effect, forcing the colder air ahead of it. The increased pressure in the heating system becomes apparent at pressure escape points 15 and 16 where the folded low pressure relief and vacuum check valve is connected to the heating system by means of tube 29.

The increased pressure becomes apparent in the connecting tube 29, the upper container 21, and water tube 26, forcing the water downward until, with sufficient pressure, air escaping from the lower end of water tube 26 (for simplicity the connection fixture will be considered as an extension of the tube in this application) bubbles upward through the water into the air space in the upper portions of container 22 as seen in FIG. 23. The increasing quantity of air entering the top portion of container 22 compresses the air in this space, air tube 30, upper container 23 and water tube 27, thus forcing the water level to lower in water tube 27 as in water tube 26, as described above. From this point the action is repeated through to the point where the air bubbles up through the water in the sump 2' where it is exhausted or discharged to the atmosphere. The total pressure at 15 and 16, the connection points to the furnace, required to exhaust air from the system is equal to the total distance that the water must be forced downward in the water tubes 26, 27 and 28. This will be explained in the following paragraph:

With reference to FIG. 23, pressure has increased enough in the system to depress the water in tube 26 and allow air to escape as bubbles into the upper part of container 22, thus compressing the air there. Increased pressure in container 22, air tube 30, upper container 23 and water tube 27 has depressed the water in tube 27, but not enough to permit bubbles of air to escape into the upper portions of container 24. Similarly, water in tube 28 has been depressed slightly due to the compression of the air in container 24, air tube 31, upper container 25 and water tube 28, by the displaced water from tube 27. Further increase in pressure will depress the water in tube 27 so that air will escape through the water to the upper portion of container 24, and a still further increase in pressure will depress the water in tube 28 to the extent that air from the heating system will be permitted to escape to the atmosphere by bubbling up through the sump container 2'. In this condition air would be bubbling through the water in containers 22, 24 and 2'. Since the total pressure developed to cause air to be vented to the atmosphere is represented by dimensions $P_1+P_2+P_3$ which, for example, as mentioned earlier, might be nine inches or 0.75 foot head of water, it follows that air will be exhausted from the system and pressure relieved at a low value. This is demonstrated by reference to the following calculation:

$x$ p.s.i.: 0.75 ft.$=1$ p.s.i.: 2.312 ft.

$x$ p.s.i.$=0.325$ p.s.i.

From this it is seen that air is exhausted from the heating system at the low pressure of 0.325 pound per square inch (p.s.i.) gage pressure.

As the fire progresses and more steam is produced in the boiler, the pressure in the system increases and the bubbling in containers 22, 24 and 2' increases and air discharges at a faster rate until steam generation ceases. Discharge of air continues from the low pressure relief and vacuum check valve until the pressure in the heating system drops to less than nine inches of water head due to discharge of air, condensation of steam in the radiators, or both. During this time steam is continually produced, although at a decreasing rate and at a lowering temperature and pressure in accordance with the conditions expressed in Table I, and the graph of FIG. 7.

As the pressure within the heating system falls below atmospheric plus the minimum air discharge pressure (0.325 p.s.i. gage), air no longer escapes through the vacuum checking system. However, now the pressure continues to lower due to condensation of steam within the radiators and pipes of the heating system. When the pressure within the heating system equals atmospheric pressure, the water level stands in the tubes at substantially the same level as in the lower containers 22, 24 and 2', as shown in FIG. 22. The change in pressure, as the pressure becomes lower, is felt within the vacuum check valve system with the effect that the water from the respective containers rises in the water tubes 26, 27 and 28.

Referring to FIG. 24, as the pressure within the heating system continues to decrease (vacuum increases) the water in tube 26 will rise due to the reduced pressure on the top of the water column, the amount of rise being proportional to the degree of vacuum, until essentially all of the water has been withdrawn from lower container 22 to fill the water tube 26 and upper container 21 to the extent of the quantity of water available in lower container 22. (Refer to Table I).

With reference to FIG. 24, the pressure in the heating system has decreased enough to allow the air pressure in the top of container 22, air tube 30, and upper container 23, to push water out of lower container 22 up into tube 26 and into upper container 21. Some expanded air due to decreased pressure will eventually be drawn into and rise through water tube 26 to container 21, and thence into the heating system.

Reduced pressure in container 23, caused by the displacement of water from container 22, similarly allows air pressure in the top of container 24, air tube 31 and container 25, to push water out of lower container 24, up into water tube 27 and into upper container 23. FIG. 24 shows this stage of the water transfer partially effected. Similarly, the reduced air pressure in upper container 25 allows the atmospheric pressure, which is acting on the sump 2', to push water out of container 2' up into water tube 28 where it is shown part way up the tube in FIG. 24.

The total vacuum developed to cause water to rise in the tubes and into the upper containers is represented by the equation:

Total vacuum = $V_1 + V_2 + V_3$

For example, if the total height the water could rise in the tubes was 15 feet, it follows from the calculation below that a high vacuum will be held in the heating system.

$x$ p.s.i. : 15 ft. = 1 p.s.i. : 2.312 ft.
$x$ p.s.i. = 6.5 p.s.i. vacuum

In effect this means that the heating system will be held in check by the vacuum check valve at a vacuum of 6.5 p.s.i.

The weight of the water column only is considered; the weight of the air column is neglected as it is so slight as to be insignificant. If the modified upper container construction as set forth in FIG. 17 is employed, the effect of minor pressure differences at the top of the water column due to whether the short leg of the syphon-type water tube is filled with water or air is not considered since it does not significantly effect the operation of the vacuum check system as long as it is relatively short in relation with the total vertical length of the tube itself. Of course, it has no effect if the construction is as that primarily shown in this application, since the short column does not exist in such construction.

The effective water column height, and hence greater vacuum checking capacity may be obtained by increasing the vertical distance between lower and upper containers or by adding complete units consisting of upper and lower containers, air tubes and water tubes, and inserting them in the system. By the latter means, the effective water column height may be increased when vertical space is not available, but horizontal space is available. This has been previously more fully described in this specification.

An increase in vacuum beyond the capacity of the vacuum checking device will merely cause the upper containers and water tubes to fill with water and withdraw all of the available water from the sump. All water in excess of that contained in the upper containers, water tubes, and that below the water tubes in the lower containers will ultimately pass through the tubes and containers into the heating system. Thereafter, air will bubble and pass through the vacuum check system and enter the furnace at the maximum vacuum the device will hold.

After the point of maximum vacuum in the heating system has been reached and the vacuum starts to decrease, the water will transfer, proportionally to the pressure, back to the lower containers in the reverse order in which it rose upon increasing vacuum.

The operation of the low pressure relief and vacuum check valve as described carried the performance through a complete cycle, from atmospheric pressure, to maximum pressure, to maximum vacuum and to atmospheric pressure again. As described, this operation through a cycle including extremes would be brought about only by unusual conditions or unusual manipulation of the heating system to observe the action of the heating system and the reaction of the low pressure relief and vacuum checking valve. Actually, normal operation of the related systems would utilize only a portion of the extreme cycle for a normal cycle of operation, and require only partial pressure or partial vacuum. During periods of cooling weather, as evening of a winter day, or a cold day following a period of warmer weather, when the furnace tends to run long and frequently, the pressure tends to rise and exhaust air from the system through the vacuum checking valve. The pressure may not have an opportunity to fall below atmospheric or to develop a vacuum during brief periods between firing. However, after the radiators approach the condition of satisfying heating demands upon them, and firing periods become of shorter duration and less frequent, the pressure in the heating system consequently becomes lower and vacuum develops due to condensation of steam in the system. Upon this condition the vacuum becomes lower upon each firing, and increases again during intervals of non-firing.

After the radiators satisfy the heating demands upon them, and still less firing is required, the vacuum will increase and reach a maximum during periods when no heat is required. In a tight system the vacuum will remain high (16 ft. head water) before falling appreciably, and then only gradually due to leakage of air into the system.

Starting and maintenance of the low pressure relief and vacuum check valve is very simple. After connecting the apparatus to the heating system as herein described, (assuming the heating system is tight) fill the sump with water. The vacuum conditions created in the heating system will draw the water into the tubes and containers. Replenish water in the sump to replace that drawn into the vacuum checking apparatus. Thereafter, see that there is some water in the sump at all times, and replenish as necessary to replace that lost by evaporation from the sump, and by evaporation into the controlled system.

What I claim as new and desire to secure by Letters Patent of the United States, is as follows:

1. Apparatus for maintaining a relatively high vacuum in a variable pressure system comprising a plurality of closed non-communicating chamber means disposed at a first elevation, each chamber means containing a body of liquid, one endmost chamber means only of said plurality being vented to atmosphere, a second plurality of closed chamber means disposed at an elevation above the first-named plurality of chamber means and being non-comunicating and adapted to receive liquid from the first-named chamber means during certain operative conditions of said system, said second plurality of chamber means being offset laterally from the first-named plurality in overlying relation thereto, liquid riser tubes corresponding in number to the chamber means of the first-named and second plurality and extending near the bottoms of the first-named chamber means and interconnecting the first-named and second chamber means and having their tops terminating near and above the bottoms of the second chamber means, said liquid riser tubes extending through the tops of the first-named chamber means, said liquid riser tubes disposed close to corresponding side walls of the first-named chamber means and close to the opposite corresponding side walls of the second chamber means, air tubes extending between and interconnecting the interiors of at least one intermediate chamber means of the first-named plurality and one endmost chamber means of the second plurality and one endmost chamber means of the first-named plurality and at least one intermediate chamber means of the second plurality, said air tubes having their lower ends terminatnig near and below the tops of the chamber means in the first-named plurality, said air tubes having their tops terminating near and below the tops of the chamber means in the second plurality, the bottoms of the air tubes terminating above the maximum level of the liquid within the first-named chamber means, said air tubes being disposed close to the other corresponding side walls of the first-named plurality of chamber means and close to the corresponding opposite side walls of the second chamber means, and a tube connected in one endmost chamber means of said second plurality and terminating near the top of such chamber means and adapted for communication with the interior of said variable pressure system, whereby vacuum pressure in said system may elevate liquid from said first-named plurality of chamber means to said second plurality of chamber means through said liquid riser tubes in series to thereby maintain the vacuum pressure in said system and prevent the admission of atmospheric air into the system and a corresponding loss of vacuum.

2. Vacuum maintaining apparatus comprising a first plurality of side-by-side closed chamber means arranged at a uniform elevation, one endmost closed chamber means of said plurality being vented to atmosphere, a body of liquid contained within each chamber means of said first plurality, a second plurality of closed chamber means in side-by-side relation at a uniform elevation above the elevation of said first plurality of chamber means and staggered laterally in one direction relative to said first plurality in overlying relation thereto, liquid riser tubes interconnecting the interiors of the chamber means of said first and second pluralities and having their lower ends disposed near and above the bottoms of the chamber means of said first plurality and having their tops terminating near and above the bottoms of the chamber means of said second plurality, air tubes interconnecting the interiors of at least a pair of said chamber means of said first plurality with at least a pair of the chamber means of said second plurality and including at least one intermediate chamber means of the first and second plurality and one endmost chamber means of the first and second plurality, said air tubes having their lower ends terminating near and below the tops of the chamber means of the first plurality and near and above the maximum level of said liquid in the first plurality of chamber means, said air tubes having their tops terminating near and below the tops of said chamber means of said second plurality, and a tube connected in an endmost chamber means of said second plurality and adapted for communication with a system in which it is desired to maintain vacuum pressure.

References Cited in the file of this patent

UNITED STATES PATENTS

| | | |
|---|---|---|
| 56,860 | Obrebwicz | Mar. 24, 1896 |
| 745,589 | Fraley | Dec. 1, 1903 |
| 901,506 | Whitney | Oct. 20, 1908 |
| 1,243,604 | Honeywell | Oct. 16, 1917 |
| 1,461,404 | Roth | July 10, 1923 |
| 2,264,107 | Willard | Nov. 25, 1941 |
| 2,720,177 | Barber | Oct. 11, 1955 |

FOREIGN PATENTS

| | | |
|---|---|---|
| 1,040 | Great Britain | of 1882 |
| 90,244 | Germany | Feb. 4, 1897 |